United States Patent [19]

Andrews et al.

[11] Patent Number: 4,794,801
[45] Date of Patent: Jan. 3, 1989

[54] BOTTLE CAP REMOVAL TORQUE TESTER

[75] Inventors: Thomas M. Andrews, Parchment; Carl L. Kuder, Vicksburg; Frederic H. Schadewald, Richland, all of Mich.

[73] Assignee: The Upjohn Company, Kalamazoo, Mich.

[21] Appl. No.: 62,913

[22] Filed: Jun. 16, 1987

[51] Int. Cl.[4] ............................................. G01L 5/00
[52] U.S. Cl. ................................... 73/862.23; 73/847
[58] Field of Search ................. 73/862.23, 862.21, 847

[56] References Cited

U.S. PATENT DOCUMENTS

| | | | |
|---|---|---|---|
| 2,300,288 | 10/1942 | Hullhorst | 73/862.19 |
| 2,337,951 | 1/1943 | Whitehead | 73/847 |
| 3,866,463 | 2/1975 | Smith et al. | 73/862.58 |
| 4,674,340 | 6/1987 | Burr et al. | 73/862.23 |
| 4,696,144 | 9/1987 | Bankutu | |
| 4,716,772 | 1/1988 | Bubeck et al. | 73/862.23 |

OTHER PUBLICATIONS

Photos 1A and 1B—Described at specification pages 2-4.

Photos 2A, 2B and 2C—Manufactured by Automated Dynamics Corporation, Denver, Colorado.

Primary Examiner—Stewart J. Levy
Assistant Examiner—Robert P. Bell
Attorney, Agent, or Firm—Flynn, Thiel, Boutell & Tanis

[57] ABSTRACT

A bottle cap removal torque sensor including a rotate motor for rotating a chuck engageable with the cap of a bottle, a support for fixing the bottle with respect to the axis of the chuck, an axial pressure supply mechanism for pressing said chuck against the bottle cap, and a torque sensor for measuring the torque applied by the motor to the bottle cap.

11 Claims, 6 Drawing Sheets

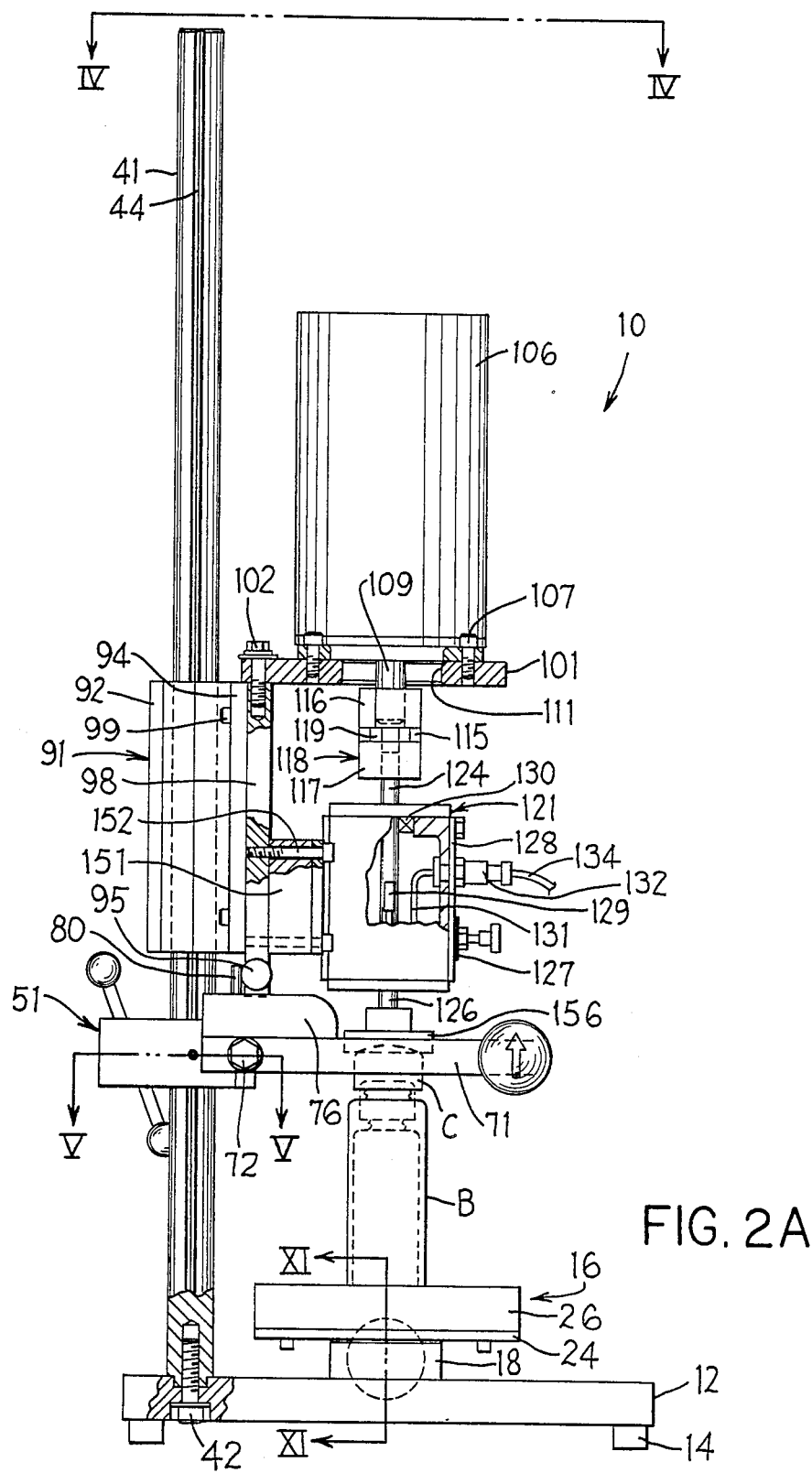

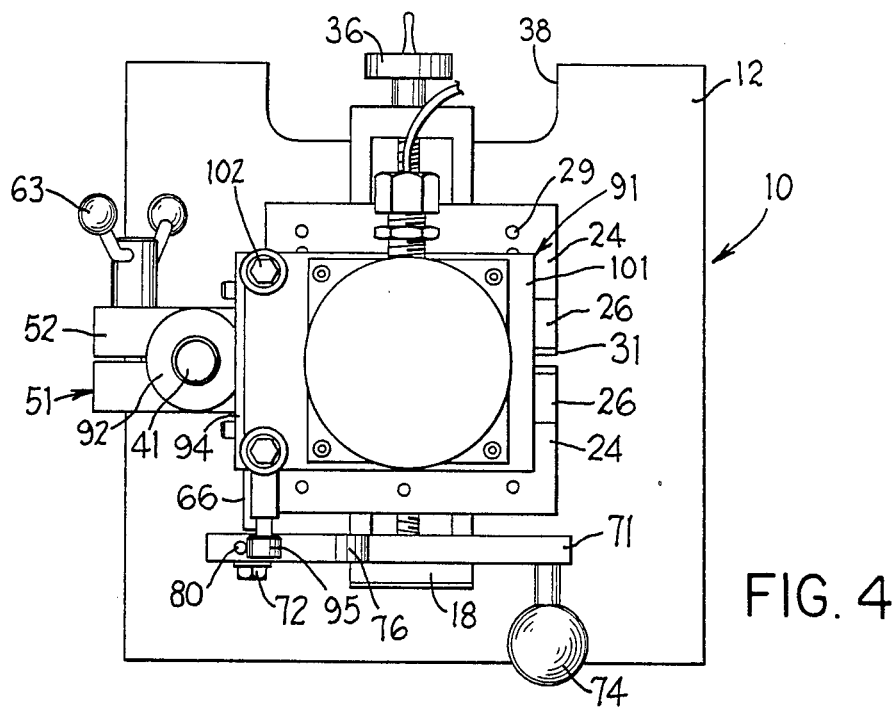
FIG. 4
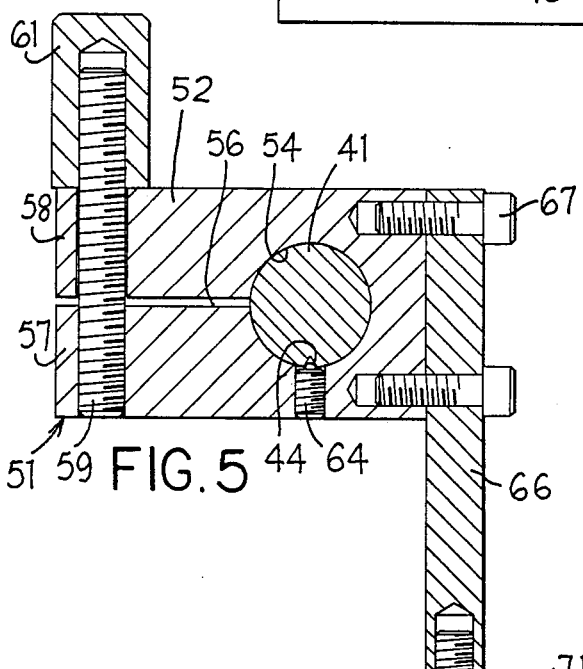
FIG. 5
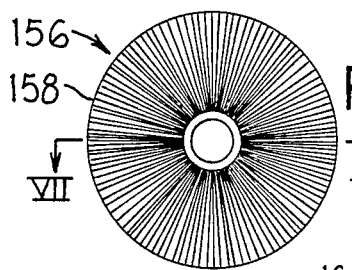
FIG. 6
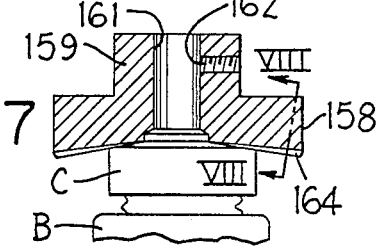
FIG. 7
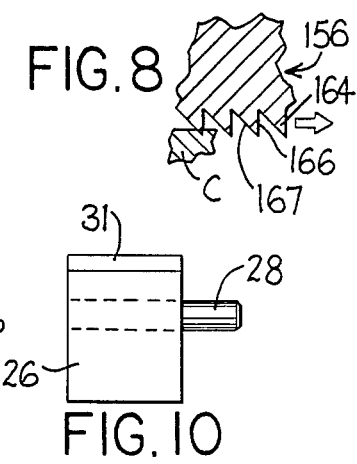
FIG. 8
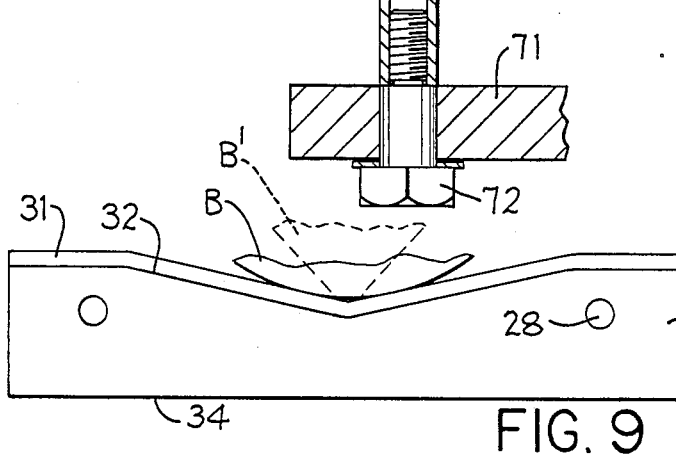
FIG. 9
FIG. 10

BOTTLE CAP REMOVAL TORQUE TESTER

FIELD OF THE INVENTION

This invention relates to apparatus for testing the torque required to move a twist cap from a bottle.

BACKGROUND OF THE INVENTION

Twist caps have long been used to seal the contents of bottles prior to shipment and sale. By providing at least vestigial threads on the cap and bottle top, rotation of the cap in one direction with respect to the bottle fixedly and sealingly connects the cap to the bottle top, while rotation of the cap in the opposite direction is required to remove the cap from the bottle prior to dispensing contents of the bottle. Such a packaging system is used in a wide variety of industries for a wide variety of goods and the bottles and caps take a wide variety of forms. In the pharmaceutical industry, for example, the "bottle and cap" may be of various forms and materials and may be known by a variety of names. However, for convenience in this application, it will be understood that the terms "bottle" and "cap" are used in a broad sense and it will be understood that by a bottle with a twist cap is meant essentially in a container with a cover whose placement and removal involves a relative twisting motion. Although the present invention is usable in a variety of industries, it was developed in connection with the pharmaceutical industry and by way of convenient example will be discussed in that context.

In the pharmaceutical industry it is particularly important that the torque which must be supplied by the consumer to open a new twist cap bottle be within a defined range. More particularly, if the cap is too loose on the newly purchased bottle, there is risk of inadequate sealing of the contents of the bottle, or at least the risk of a doubt on that point by the consumer. On the other hand, if the cap is too tight on the newly purchased bottle, the consumer will have difficulty in removing it, resulting in unwanted consumer frustration and dissatisfaction. While automatic twist capping machines are controllable as to the torque applied in securing the twist cap to the bottle, the twist cap removal force may vary over time due to minor gradual changes in cap and bottle dimensions, capping machine wear or misadjustment, or a variety of other causes. Accordingly, it has been the practice, at least in the pharmaceutical industry, to test, on a sampling basis, the bottle cap removal force on completed twist capped bottles prior to packaging for shipment.

A prior bottle cap removal torque tester (torque tester), which has been in use for many years, includes a horizontal base plate on which lies a circumferentially spring biased turntable. Rotation of the turntable against the spring force correspondingly rotates an indicator needle across an analog scale located at the front end of the base plate. The turntable carries jaws threadedly adjustable toward and away from each other. The jaws are horizontally movable diametrally to the turntable. A screw rotatable diametrically the turntable engages the jaws to move same toward and away from each other. A bottle upstandingly supported on the turntable is gripped between the two jaws to hold it against rotation with respect to the turntable. An upstanding post rises from the base behind the turntable. A sleeve is axially and circumferentially movable on the post and is fixable thereto by a thumb screw extending radially through the sleeve and into engagement with the periphery of the post. The height of the sleeve on the post is set to correspond to the height of the bottle to be tested. A beam is fixed to and extends forwardly from the sleeve and on its forward end carries in a cantilevered manner a vertical tube. A vertical shaft is rotatable and vertically slidable in the vertical tube. A rubber clamping ring fits loosely around cap and is tightened around circumference of cap by a handle attached to a cam which forces a steel disc down on the confined rubber ring, forcing it tight against the side of cap. To maintain a consistent downward force, a horizontal platform is fixed to the top of the shaft for carrying manually stacked weights. A coaxial rod is upstanding from the platform and passes through central openings in the weights to prevent them from falling off the platform. A radial lever extending from the lower end of the shaft permits a person to manually rotate the shaft and hence rubber clamping ring in the loosening direction of the cap. As long as the cap remains tight on the bottle, the circumferential advancement of the lever results in corresponding circumferential advancement of the bottle and turntable against the turntable restoring spring force and hence advances the needle across the analog scale, until the restoring torque of the turntable spring exceeds the torque required to loosen the cap.

Finally, a bell crank is pivoted on the cantilevered member. The bell crank has a lift arm carrying a roller underlying the weight platform such that upward and forward swinging of that arm lifts the weight platform and hence the rubber disk upward to free the bottle. The forward end of the bell crank has a handle on it which a person can push down to thus lift the weight platform and rubber clamping ring, or can allow to pivot up and back to lower the weight platform and rubber clamping ring onto a bottle cap for testing. A downward and forward extension of the first arm engages a stop on the cantilevered beam to limit rearward pivoting of the first arm and hence limit downward movement of the weight platform and chuck with respect to the cantilevered beam.

Applicant has noted a number of sources of error and nonrepeatability and other difficulties in this prior apparatus, which the present invention seeks to overcome.

Accordingly, the objects and purposes of the present invention include the provision of:

(1) A bottle cap removal torque tester apparatus which eliminates manual rotation of the chuck and hence reduces variation in chuck rotational acceleration and velocity in tests conducted by different persons or by the same person at different times, and wherein chuck rotation is carried out electrically with precise and repeatable control of acceleration and velocity.

(2) An apparatus as aforesaid which positively engages bottle caps of a wide variety of sizes and materials without slippage, and in which rubber friction engagement between chuck and cap is eliminated.

(3) An apparatus as aforesaid in which the weight of operating portions of the apparatus enhances positive engagement of the cap, and in which repeatable vertical friction in vertical movement of the chuck toward and away from the cap so as to equalize friction in the actual down force of the chuck on the cap.

(4) An apparatus as aforesaid which senses the torque applied to the cap at a location interposed between the cap and a cap rotate motor, which can store and read out bottle cap removal force measurements and which can be made self contained and movable from place to place by use of a battery power source.

(5) An apparatus as aforesaid which is usable with a variety of shapes and sizes of bottles and which is capable of automatically centering the bottle beneath the cap engaging portion of the apparatus.

(6) An apparatus as aforesaid which is readily operable by persons with little training and relatively simple and inexpensive in structure, but provides a substantially improved reliability and repeatability in measurements.

Other objects and purposes of the invention will be apparent to person acquainted with apparatus of this general type upon reading the following specification and inspecting the accompanying drawings.

SUMMARY OF THE INVENTION

The objects and purposes of the invention are met by providing a bottle cap removal torque sensor including a rotate motor for rotating a chuck engageable with the cap of a bottle, a support for fixing the bottle with respect to the axis of the chuck, an axial pressure supply mechanism for pressing said chuck against the bottle cap, and a torque sensing for measuring the torque applied by the motor to the bottle cap.

BRIEF DESCRIPTION OF THE DRAWINGS

FIG. 2A is an enlarged left side view of the FIG. 1 apparatus.

FIG. 4 is a top view of the FIG. 2 apparatus and as generally indicated by the line IV—IV of FIG. 2A.

FIG. 5 is an enlarged fragmentary cross-sectional view substantially taken along the line V—V of FIG. 2A.

FIG. 6 is a bottom view of the chuck of FIGS. 2A and 2B.

FIG. 7 is a central cross-sectional view of the chuck of FIGS. 2A and 2B substantially taken along the line VII—VII of FIG. 6.

FIG. 8 is an enlarged fragmentary cross-sectional view substantially taken along the line VIII—VIII of FIG. 7.

FIG. 9 is a top view of one of the bottle clamp jaws of FIG. 2A.

FIG. 10 is a right end view of the FIG. 9 clamp jaw.

DETAILED DESCRIPTION

Figure 1:
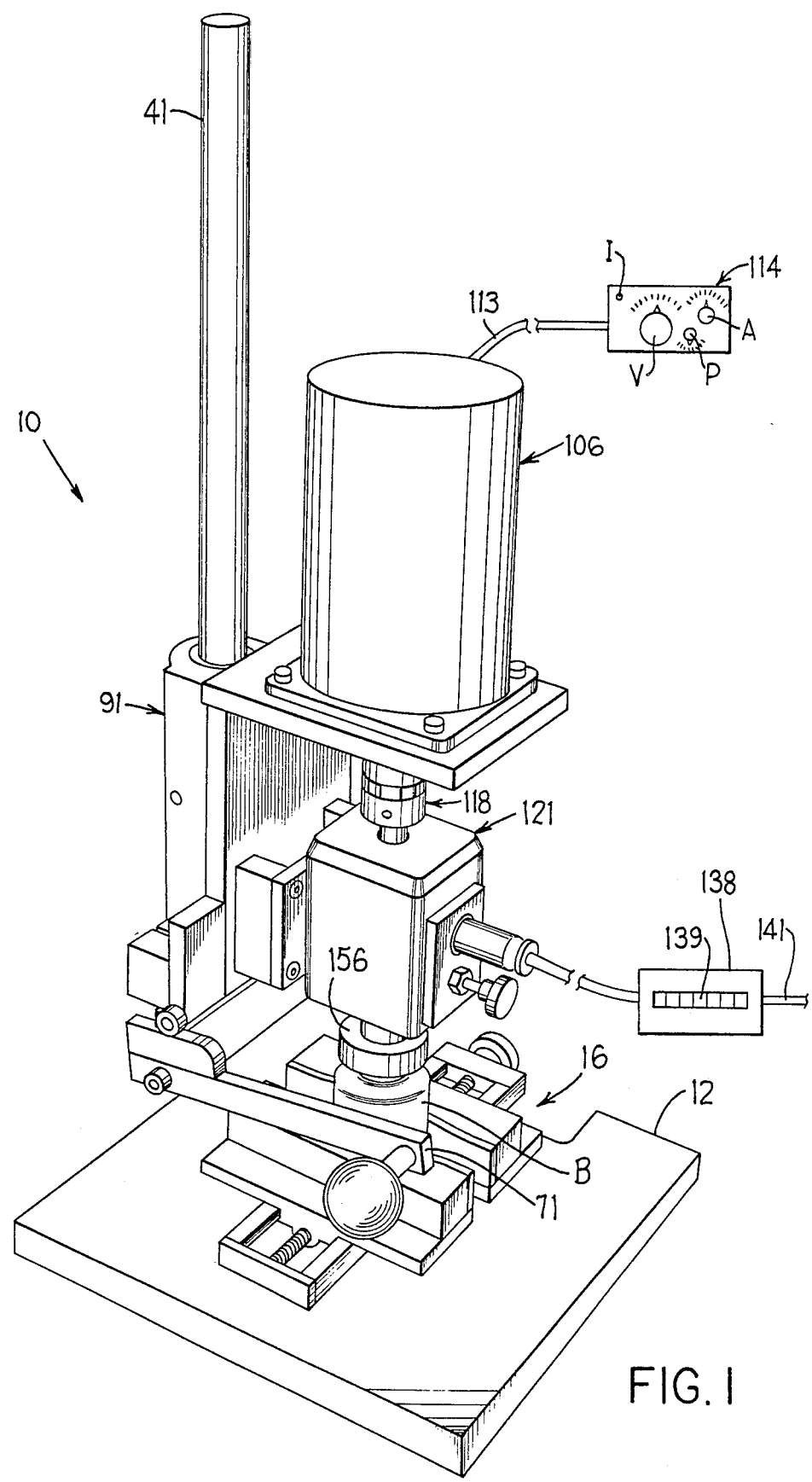
FIG. 1 is a pictorial view of an apparatus embodying the invention.
Figure 2B:
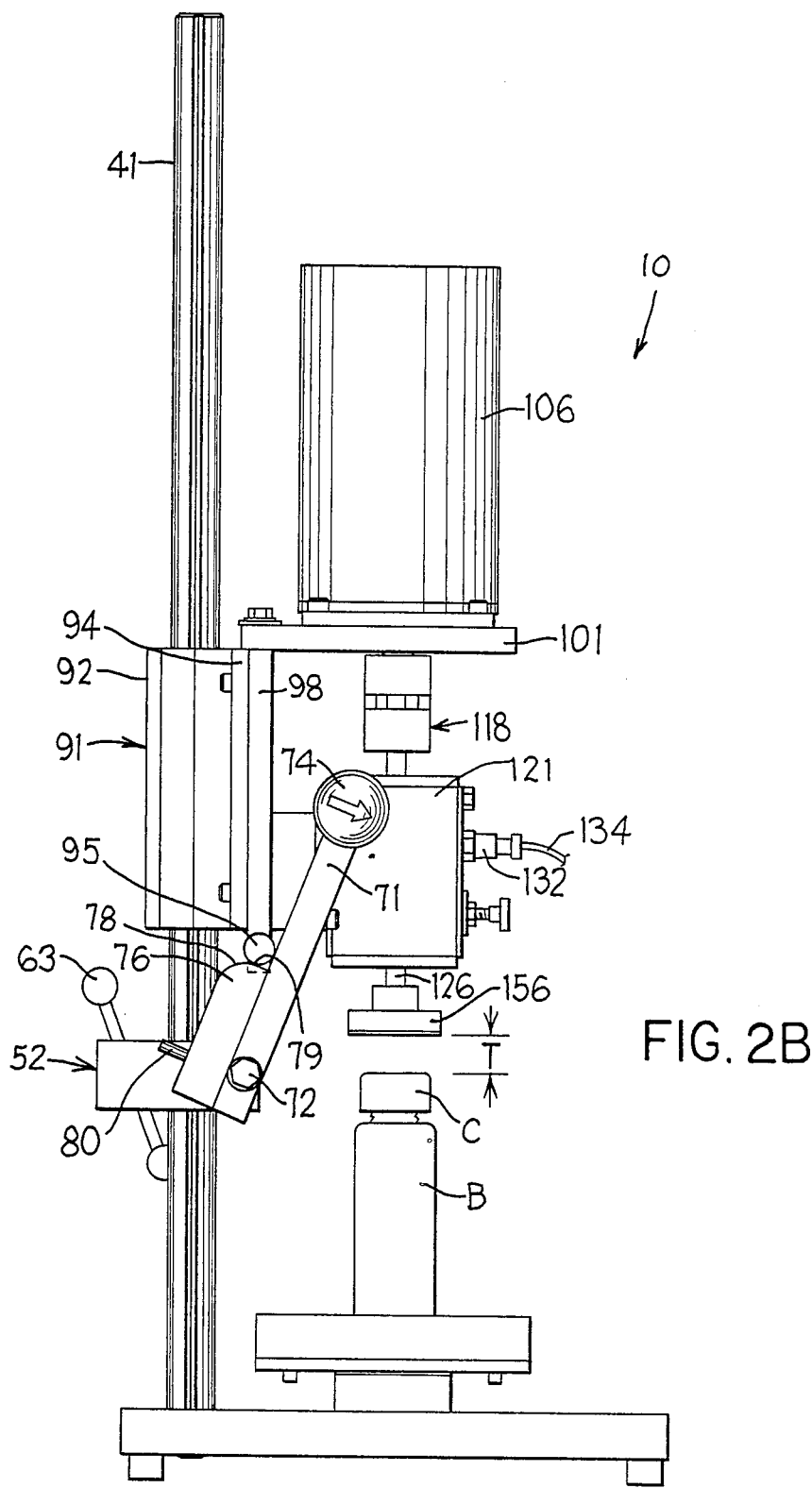
FIG. 2B is a view, similar to FIG. 2A with the carriage in its upper position for permitting an exchange of bottles therebeneath.
Figure 3:
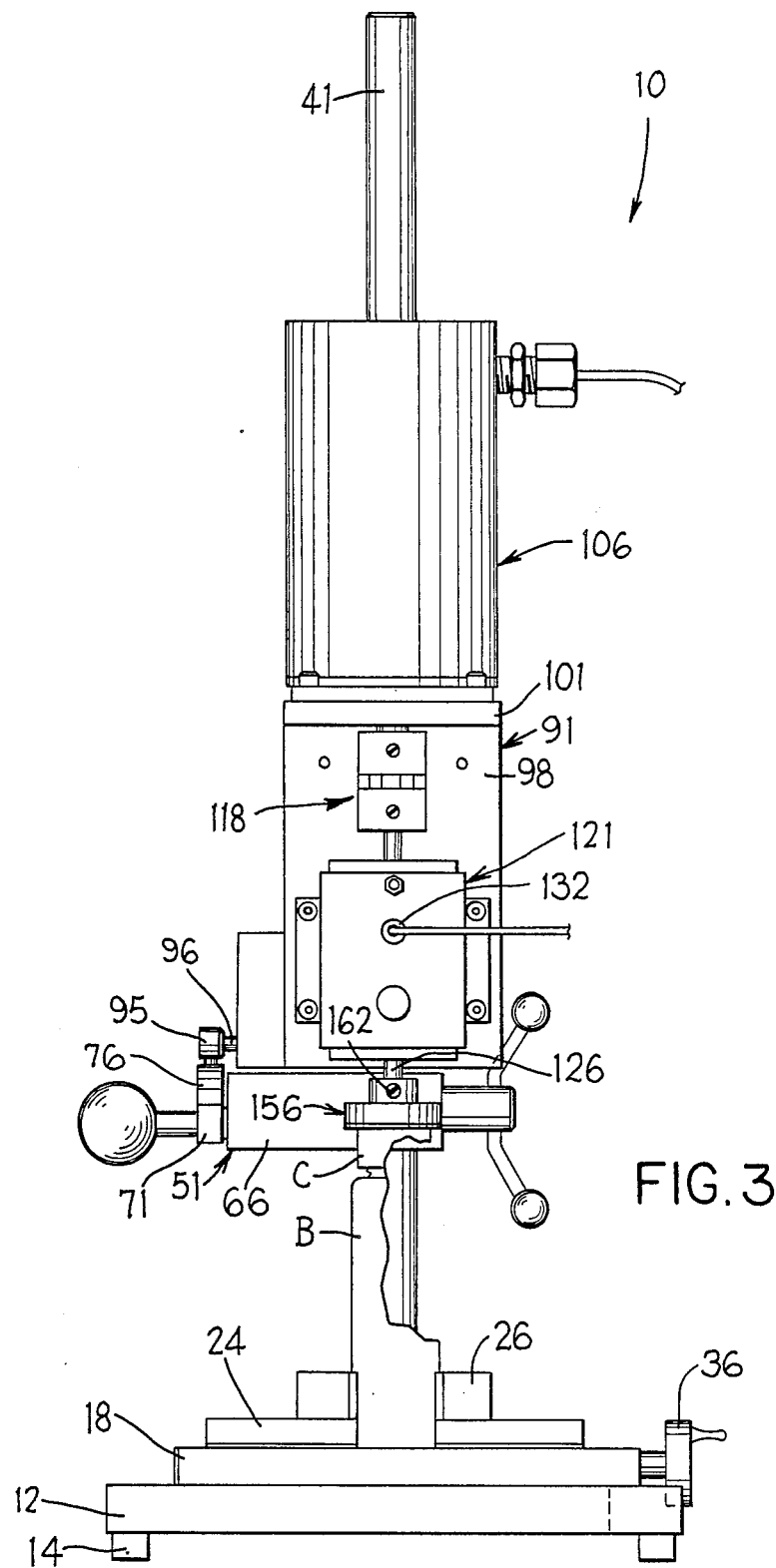
FIG. 3 is a front view of the FIG. 2 apparatus.

In the following description, the terms left and right refer to directions in FIG. 3, i.e. taken from the front of the apparatus. The bottle cap removal torque tester 10 embodying the invention includes a horizontal base plate 12 (FIGS. 1 and 2A) having depending feet at the corners thereof for support on a suitable support surface (not shown), in a stable manner.

Figure 11:
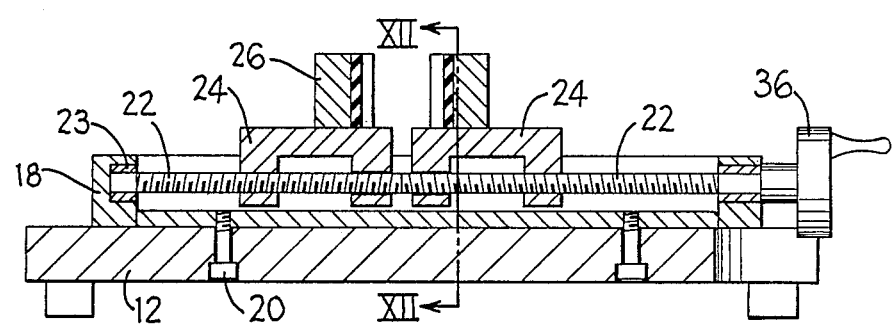
FIG. 11 is a central cross-sectional view of the bottle clamp assembly, substantially as taken on the line XI—XI of FIG. 2A.
Figure 12:
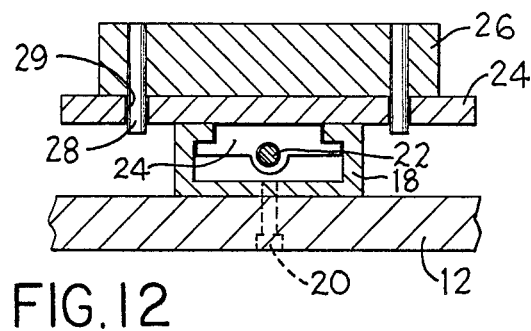
FIG. 12 is a sectional view substantially taken on the line XII—XII of FIG. 11.

A bottle clamp assembly 16 (FIGS. 2A, 3, 11 and 12) comprises a guideway 18 fixed centrally atop the base plate 12, as by screws 20 (FIGS. 11 and 12). An adjusting screw 22 extends lengthwise of the guideway 18 and is supported rotatably thereon by bearings 23. As indicated in FIG. 11, the right and left halves of the screw 22 are threaded in opposite directions. Opposed jaw carriers 24 threadedly engage the oppositely threaded portions of the screw 22 so that rotation of the screw 22 in opposite directions respectively moves the jaw carriers 24 toward and away from each other. The jaw carriers 24 extend above the screw 22 and are slidably guided on the guideway 18 to move horizontally from side-to-side above the base plate 12.

The jaws 26 each have a pair of depending pins 28 removably receivable in pairs of holes 29 in the tops of the jaw carriers 24, successive pairs of such holes 29 being spaced progressively further apart laterally. Thus, the jaws 26 can be placed in successive further apart positions without adjustment of the screw 22, to accommodate bottles of substantially varying width, while yet allowing a given bottle to be gripped by such jaws upon rotation of the screw 22 in a direction to bring such jaws 26 together against opposite sides of such bottle.

The jaws preferably each have a resilient (here neoprene) bottle engaging face layer 31 (FIGS. 9 and 10). One side of each jaw 26 preferably has a shallow V-groove 32 centered along the length thereof, to facilitate self-centering of bottles, particularly round or oval bottles between the jaws. Square or rectangular shaped bottles are also gripable between the jaws, for example by rotating the jaws 180° with respect to their respective jaw carriers 24 so that the linear back faces 34 of the jaws 26 are opposed in a manner not shown.

A handle 36 (FIG. 11) fixed to one end of the screw 22 is rotatable to rotate the screw and thus tighten or loosen the clamp on a given bottle. The base plate 12 is here notched at 38 (FIG. 4) in the region of the handle 36 to facilitate grasping of the handle 36 by a person to operate the clamp assembly 16.

In one embodiment, the guideway 18, screw 22 and jaw carriers 24 were implemented by means of a Screw Motion Unislide Assembly, catalog No. A2509B, available from Velmex Inc. of East Bloomfield, N.Y.

Centered on the base plate 12 behind the bottle clamp assembly 16, adjacent the rear edge of the base plate 12, is a vertical post 41 (FIG. 2A). The post 41 upstands rigidly from the base plate 12. In the embodiment shown, the bottom of the post 41 is recessed in the base plate and is fixed to the base plate by a screw 42 which extends upward through the base plate into the bottom of the post 41 and threadedly engages the latter. For purposes appearing hereafter, the upstanding post has a guide groove 44 in FIGS. 2A and 5 on the left side thereof.

A support unit 51 (FIGS. 2B, 4 and 5) comprises a support block 52 having a vertical through opening 54 upward through which is snugly but slidably received the upstanding post 41. A rear opening slot 56 extends rearward through the support block 52. The slot 56 divides the rear portion of the support block 52 into left and right legs 57 and 58. A clamping screw 59 extends laterally through the rear portions of the legs 57 and 58. The screw 59 threadedly engages the leg 57 and extends loosely through an opening in the leg 58. The screw has a head 61 fixed thereon and equipped with a manually engageable, diametrically extending handle 63. Tightening of the screw 59, by appropriate rotation of the handle 63, pulls the legs 57 and 58 closer to each other, thereby reduces the lateral diameter of the through opening 54 and thus clamps the support block fixedly on the shaft 41. A set screw 64 threads through the left side of the support block 52 and has its inner end slidably engaged in the guide groove 44 in the upstanding posts 41 so as to prevent rotation of the support unit 51 with respect to the post 41, while yet permitting vertical adjustive displacement of the support unit 51 along the post 41. The cross sectional shape of the inner end of the set screw 64 conforms to the cross sectional shape of the groove 44, so as to prevent rotation of the support block 52 on the post 41 but permit vertical adjustment thereof when the screw 59 is loosened.

An arm support plate 66 is fixed, here by screws 67, to the front of support block 52. The arm support plate 66 extends leftward (FIG. 3) from the support block 52 (FIG. 5). A cam arm 71 is pivotally supported on the left end of the arm support plate 66 by a shouldered screw 72 (FIG. 5) and extends generally forward therefrom generally as indicated in FIGS. 2A, 2B and 4. The front end of the arm 71 is provided with a leftward extending knob 74 engageable by a person for purposes appearing hereafter. A cam 76 is fixed atop the rear portion of the arm 71 (FIGS. 2A and 2B) and has a convex and forward facing, downwardly sloping cam ramp 78. The front end of the cam ramp 78 meets the top of the arm 71 substantially at a right angle to form a notch 79. The cam ramp 78 is here substantially semi-circular in profile. A stop pin 80 is fixedly upstanding from the top of the cam 76, here at a location just to the rear of the vertical diametral plane of the screw 72, as seen in FIG. 2A with the cam arm 71 extending horizontally forward.

A carriage 91 is vertically slidable on the post 41 above the support unit 51. The carriage 91 comprises a low friction linear bearing unit 92 (FIGS. 2B and 4), to the forward face of which is fixed a forward facing, upstanding mounting plate 94. In one embodiment, the linear bearing unit 92 was a Thompson Super Ball Bushing, Twin Pillow Block with Ball-Groove, catalog no. TWN-16-BG, available from Detroit Ball Bearing of Kalamazoo, Mich. The linear bearing unit 92 includes a follower (not shown) for example in the shape of a ball, receivable in the guide groove 44 of the upstanding post 41 to positively prevent rotation of the linear bearing unit 92 with respect to the post 41.

A cam follower roller 95 is rotatably secured on a stub shaft 96 protruding fixedly leftwardly (FIG. 3) from the carriage mounting plate 98 and overlying the cam 76. The roller 95 normally rides on the cam 76 to lift and lower the carriage 91 with respect to the support unit 51 upon raising and lowering the cam arm 71 between its FIGS. 2A and 2B positions.

The cam arm is stable in its raised FIG. 2B position because the roller 95 lodges stably in the notch 79, and requires a positive forward and down force on the handle 74 by the operating person to rotate the cam arm 71 clockwise from this stable FIG. 2B raised position. The cam arm is also stable in its lowered FIG. 2A position since interference between the pin 80 and the roller 95 prevents further clockwise (downward) movement of the cam arm.

A forward facing carriage main plate 98 is fixed to the front of the linear bearing mounting plate 94 by screws 99. A motor mounting plate 101 has its rear edge portion fixed by screws 102 upon the top edge of the carriage main plate 98 and the motor mounting plate 101 is horizontally cantilevered forwardly therefrom. A precisely controllable rotate motor 106 is fixed atop the motor mounting plate 101 by screws 107 and has a rotatable shaft 109 which depends loosely through an opening 111 in the motor mounting plate 101. The rotate motor 106 is preferably a stepping motor capable of being precisely controlled as to both its acceleration and velocity of rotation.

In one embodiment, the motor 106 was an M-series stepping motor, catalog No. M106-178S, available from Compumotor Corporation located at Petaluma, Calif. This particular stepping motor requires a 115 VAC supply, has a 0–64 inch ounce torque range, provides 25,000 steps per revolution and is capable of finely repeatable control. For example, speed can be set at a very low rate, for example such that a half revolution of the shaft 109 may take several seconds. A typical rotation speed might be 6 to 12 rpm. The required circumferential displacement is relatively small, and depends on the type of cap to be opened, typically a half or quarter revolution for a tamper proof cap or less than a sixteenth of a revolution for a simple screw cap. The motor 106 is connected, by conventional electric cable 113 capable of transmitting rotation inducing pulses, to a rotate speed control 114 (FIG. 1) having manually preset acceleration and velocity selectors A and V respectively. A rotation initiation control I is manually actuable to start rotation of motor 106. The circumferential extent of rotation can be determined as desired, as by presetting of an angular displacement control D. A reset control R is actuable after each test to return the shaft of motor 106 to its starting circumferential position. The control 114 may be of any desired type but in the embodiment shown is a digitally set, pulsed output control. A suitable control is available with the stepping motor and is known as the Compumotor indexer Model 172A.

A torque sensor 121 comprises a housing 128 spaced by a pair of side-by-side, upstanding, stand-off blocks 151 (FIG. 2A) from the carriage mounting plate 98. The housing 128 is fixed to the mounting plate 98 by elongate screws 152 running through a laterally extending flange of the housing 128 and the stand-off blocks 151 and threadedly engaging the carriage mounting plate 98. The torque sensor 121 has an upstanding input shaft 124 positively rotatably driving a depending output shaft 126. The torque sensor 121 is so located that its shafts 124, 126, are vertical and coaxially aligned below the shaft 109 of the rotate motor 106.

The rotate motor shaft 109 rotatably drives the input shaft 124 of the torque sensor 121 through a shaft coupling 118. The shaft coupling 118 positively connects the shafts 109 and 124 but includes a resilient insert 119 located circumferentially between circumferentially offset, axially projecting, squared teeth 115 on the axially opposed ends of the upper and lower coupling halves 116 and 117, to reduce shock loads applied by the rotate motor 106 to the torque sensor 121 (and thereby to minimize "jerk" and higher order differentials of circumferential displacement with respect to time). The upper and lower chuck halves 116 and 117 are fixed to the respective shafts 109 and 124 by any convenient means such as set screws not shown and are fixed together through the resilient insert 115 which is secured thereto in any conventional means, such as by adhesive bonding. A suitable coupling 118 is available from Edwards Industrial Sales, Kalamazoo, Mich. and comprises CHJP2 upper and lower halves with a JZ2 neoprene insert. An electrical output representing the torque applied to input shaft 124 is taken through cable 134 (FIG. 2A) to an output device 138 (FIG. 1), providing a torque readout, here a digital readout, generally indicated at 139. The output device is preferably of a type which is self powered and capable of storing a number of torque values in an internal memory. The output device 138 preferably has an internal battery to allow stored values to be maintained if the output device 138 is disconnected from the torque sensor 121, and moved to a remote location. The output device 138 has a data output 141 connectable to a general purpose computer at such remote location for acting on bottle cap removal force data in a desired manner. A suitable torque sensor 121 is available under catalog No. 2220-5 from GSE, Inc., located at Farmington Hills, Mich., and has a torque capacity of 44 inch pounds with a high sensitivity bridge. A suitable output device 138 is available from GSE, Inc. under the designation Data Tork model 238 with input set to accept the high sensitivity bridge output of 4 mv/V from the model 2220-5 torque sensor.

FIG. 2A shows schematically a simplified form of torque sensor in which the input shaft 124 and output shaft 126 are connected by an intermediate portion 127 disposed within the housing 128 of the torque sensor 121, the intermediate shaft portion 127 carrying torque responsive means, such as a strain gauge 129 arranged to be responsive to torsional deflection of the intermediate shaft portion 127 due to a rotational torque applied to the input shaft 124 and resisted by means (hereafter described) fixed to the output shaft 126. On the other hand, the strain gauge 129 is insensitive to other forces or deflections, e.g. axial deflection, applied to the intermediate portion 127. The shaft structure 124, 126, 127 is axially fixed and rotatably supported by bearings 130. The output of the strain gauge 129 is applied to a cable 131 and connector 132 and thence to the external cable 134.

A chuck 156 is fixed on the output shaft 126 of the torque sensor 121 for rotation therewith. The chuck 156 (FIGS. 3 and 6–8) comprises a circular disk 158 from which upwardly projects an axial flange 159. A coaxial central opening 161 extends through the chuck and snugly receives the output shaft 126 of the torque sensor 121. A set screw 162 extends radially through the axial flange 159 to fix the chuck on the output shaft 126. The bottom of the disk 158 has a shallow concave, conical dish shape coaxial with the opening 161. A plurality of radiating teeth 164 are formed in the shallow conical bottom of the disk 158. As seen in FIG. 8, the teeth 164 have a saw tooth cross section, each tooth having a substantially vertical face 166 facing in the direction of cap loosening rotation (as indicated by the arrow in FIG. 8), and a sloped trailing face 167. In this way, the sharp hardened steel of the chuck teeth 164 can positively engage and indeed may bite into the typically softer material of conventional plastic and aluminum caps C to avoid rotation-conventional slippage between the chuck and bottle cap. Moreover, as clear from FIG. 7, the shallow conical shape of the bottom of the disk 158 and the corresponding radiating arrangement of the teeth 164 along such shallow conical bottom permits the chuck to positively engage caps of a wide variety of diameters by engaging each size flat topped cap at its periphery.

OPERATION

Initially the tester 10 is supported on a suitable table, bench or the like and the rotational speed control 114 and the output device 138 are electrically energized by a suitable power source or sources (AC wall current, battery supply or the like). With the cam arm 71 pivoted to its upward position (FIG. 2B), handle 63 (FIGS. 4 and 5) is rotated to loosen the grip of the support block 52 on the upstanding post 41. This permits the raising or lowering of the support unit 51, and therewith the carriage 91 supported thereon, until the chuck 156 is at a height sufficient to clear the cap C of a bottle B seated on a guideway 10 of the bottle clamp assembly 16. The handle 63 of the clamping screw 59 is then oppositely rotated to fixedly clamp the support block 52 to the post 41.

The jaws 26 are symmetrically positioned on the jaw carriers 24 at a desired distance apart by location of their pins 28 in corresponding pairs of holes 29 in the jaw carriers 24. The jaw carriers 24 are separated by rotation of the screw 22 (FIG. 11), sufficient to allow insertion of the bottle B between the jaws 26. The shallow V-groove 32 assists self-centering of the bottle B coaxially of the chuck 156 located thereabove. Bottles B of a variety of shapes will tend to self-center in view of the groove 32 in each jaw 26. The self-centering effect is shown with a circular cross-sectional bottle in solid line in FIG. 9. Multisided bottles, particularly those with an even number of sides, will also tend to self-center if opposite corners of the bottle are located at a corresponding V-groove 32 vertex in each of the two opposed jaws 26. See for example the dotted line fragment of a square bottle B' in FIG. 9. In any event, the bottle B is readily fixedly centered coaxially beneath the chuck 156 by rotation of the handle 36 to tighten the jaws 26 on the bottle B. The bottle B is thus fixedly supported in upstanding relation on the horizontal guideway 18 with its cap C close spaced below and coaxial with the chuck 156.

The cam arm 71 is then lowered (pivoted clockwise) from its raised, rest position of FIG. 2B to its lowered measurement position of FIG. 2A. This causes the roller 95 to roll along the cam 76 from its stable rest position in the notch 79 shown in FIG. 2B, toward and into engagement with the pin 80 where it arrests further clockwise (downward) movement of the cam arm 71. Prior to engagement by the roller 95 with the pin 80, the chuck 156 comes to rest upon the cap C of the waiting bottle B as seen in FIG. 2A. Accordingly, during the last portion of the clockwise swing of the cam arm 71, the entire weight of the carriage 91, rotate motor 106, torque sensor 121 and chuck 156 comes to rest upon the cap C of the bottle B, whereafter the roller 80 is left spaced slightly above the top of the cam 76 as the latter reaches its downward position shown in FIG. 2A.

The weight thus resting on the cap C of the bottle B is substantial, for example 20 lbs. In view of the low friction bearing 92, this weight slides freely up and down the post 41 and is not significantly retarded by friction. Moreover, this weight is sufficient to reliably positively engage the chuck 156 with the bottle cap C and no removable weights are needed. Accordingly, the downward force of the chuck 156 on the bottle cap C is precisely repeatable from bottle to bottle and from human operator to human operator, which facilitates precise repeatability of torque measurements.

The radiating saw teeth 164 in the shallow conical underface of the chuck 156 are forced downward against the bottle cap C by the weight of the carriage 91, motor 106, torque sensor 121 etc. The teeths thus positively engage, and indeed may bite slightly into, the top of the cap C. Because of the shallow conical contour of the chuck underface, the teeth 164 engage the cap adjacent its periphery so as to maximize the torque applicable to the cap without slippage. Moreover, the vertical faces 166 of the teeth face in the direction of rotation to further increase applicable torque without slippage of the chuck on the cap.

The acceleration and velocity selectors A and V of the rotate speed control 114 (FIG. 1) are preset to the desired velocity and acceleration levels. Normally the acceleration level is set low enough to avoid any jerk or shock loading might tend to cause the teeth 164 to slip with respect to the cap C. Moreover, the velocity of rotation may be kept low since only a small circumferential displacement of the cap is normally needed to effect the required starting torque measurement. The permitted rotational displacement may be preset by means of a rotational displacement limit control D on the rotate speed control 114.

The test is initiated by the human operator actuating the rotate initiation control I, causing the motor 106 to apply a rotational torque through the coupling 118, the shafts of the torque sensor 121 and the chuck 156 to the cap C. The torque sensor 121 senses the torque required to start rotation of the cap C. This torque appears on a readout 139 of the output device 138, which not only displays the torque reading but also preferably stores it for future analysis.

Upon completion of the measurement, the cam arm 71 is lifted by the human operator from its FIG. 2A position to its FIG. 2B position, thus raising the carriage 91, motor 106, torque sensor 121 and chuck 156 to a location spaced above the bottle cap C. Entry of the roller 95 into the notch 79 maintains the carriage 91 and chuck 156 in the elevated FIG. 2B position.

Thereafter, the bottle clamp assembly 16 may be loosened, by reverse rotation of the handle 36, thereby retracting the jaws 26 away from the sides of the bottle B, whereafter the bottle B can be removed and replaced by a second bottle to be tested. Thereafter a second test can be carried out in the manner above discussed.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A bottle cap removal torque tester comprising:
   vertical guide means;
   means for fixedly holding a bottle to be tested with respect to said vertical guide means;
   a chuck engageable with the cap of said bottle for rotating said cap with respect to said bottle; and
   a chuck rotating means for rotatably driving said chuck and for axially pressing said chuck against said cap on said bottle, said chuck rotating means comprising a power driven rotate motor for rotating said chuck in a direction to loosen said cap from said bottle and a torque sensor for sensing the torque applied by said rotate motor to said bottle cap;
   a support unit alternatively fixed on and vertically slidable on said vertical guide means;
   a carriage vertically slidable on said vertical guide means above said support unit, said carriage carrying said chuck rotating means;
   means interposed between said support unit and carriage and manually actuable to raise and lower the carriage with respect to said support unit, said means to raise and lower said carriage comprising an arm pivoted on said support unit, a cam fixed on one of said arm and carriage, a cam follower roller on the other of said arm and carriage, said roller opposing said cam for riding thereon to support said carriage except when a bottle cap supports said chuck and therewith said carriage, said arm having means urgeable for pivoting said arm in a direction to interengage said roller and cam and therewith raise said carriage with respect to said support units, and means for holding said carriage stable in a raised position without further urging of said arm.

2. The apparatus of claim 1, in which said support unit comprises a slotted support block snugly surrounding said vertical guide means, said vertical guide means comprising an upstanding post, and means clamping said block to said post in fixed relation thereto and in a releasable manner.

3. The apparatus of claim 1, in which said carriage includes low friction linear bearing means permitting free sliding movement of said carriage on said vertical guide means, the weight of said carriage and chuck rotating means and chuck being the entire weight to urge said chuck down upon said bottle cap.

4. The apparatus of claim 1, wherein said cam is on said arm pivoted on said support unit and said cam follower roller is on said carriage and opposes said cam, said cam underlying said roller so that upward pivoting of said arm engages the cam with said roller and lifts and carriage with respect to said support unit.

5. The apparatus of claim 4, in which the surface of said cam is convex, said means for holding said carriage stable in a raised position comprising a notch in said cam which in the raised position of the arm receives the follower roller in overcentered relation therein to make stable the raised position of the arm and carriage, said arm being manually lowerable to remove said roller from said notch, said cam having an upstanding abutment which approaches and is engageable with the roller in the downward position of the arm so as to prevent positively the further downward movement of the arm and thereby, in the absence of a bottle in the apparatus, preventing further downward movement of the carriage beyond its normal lowered position.

6. The apparatus of claim 1, including a resilient coupling interposed between said motor and torque sensor for minimizing application of rotational shock loads upon acceleration of said motor.

7. A bottle cap removal torque tester, comprising:
   a disklike chuck engageable with a wide range of diameters of bottle caps to be tested; said chuck having a plurality of cap engaging teeth;
   rotate motor means actuable for rotating said chuck;
   a torque sensor responsive to application of torque to said cap and bottle;
   means for pressing said chuck axially against the cap of said bottle and responsive to rotation of said motor for rotating said cap on said bottle, said pressing means being positioned for axially pressing the teeth of said chuck against said cap to ensure positive engagement thereof, in which said chuck has a nearly flat, shallow, concave, conical, cap engaging face, said face having said teeth extending nearly radially from the center thereof, such that the teeth engage the top of the bottle cap adjacent its periphery for application of torque thereto.

8. The apparatus of claim 7, in which said teeth have a sawtooth profile with a leading face substantially perpendicular to the direction of rotation and a trailing face sloping away therefrom.

9. The apparatus of claim 7, in which said motor means rotatably drives said chuck through said torque sensor, said motor and torque sensor and chuck being vertically stacked and supported on a vertically movable carriage located over a bottle site, the entire weight of said carriage and motor and torque sensor and chuck being applied to force said chuck downward against the bottle cap.

10. A bottle cap removal torque tester comprising:
vertical guide means;
means for fixedly holding a bottle to be tested with respect to said vertical guide means;
a chuck engageable with the cap of said bottle for rotating said cap with respect to said bottle;
a chuck rotating means for rotatably driving said chuck and for axially pressing said chuck against said cap on said bottle, said chuck rotating means being slidable on said vertical guide means to move said chuck toward and away from said cap, said chuck rotating means comprising a power driven rotate motor for rotating said chuck in a direction to loosen said cap from said bottle and a torque sensor for sensing the torque applied by said rotate motor to said bottle cap, said motor being an electric stepping motor and an associated control unit for said stepping motor having presetable velocity and acceleration controls;
a carriage vertically slidable on said vertical guide means, said carriage supporting fixedly thereon said chuck rotating means, said carriage having low friction linear bearings engaging said vertical guide means, the axial contact force between the chuck and a cap being to be tested being equal to the weight of said carriage and chuck rotating means and chuck; and
a resilient coupling interposed between said motor and torque sensor for minimizing application of rotational shock loads upon acceleration of said motor.

11. The apparatus of claim 10, in which said torque sensor has associated therewith a digital display for displaying torque readings and means for storing such torque readings.

* * * * *

UNITED STATES PATENT AND TRADEMARK OFFICE
CERTIFICATE OF CORRECTION

PATENT NO. : 4 794 801

DATED : January 3, 1989

INVENTOR(S) : Thomas M. ANDREWS et al

It is certified that error appears in the above-identified patent and that said Letters Patent is hereby corrected as shown below:

Change the title from "BOTTLE CAP REMOVAL TORQUE TESTER" to
---BOTTLE CAP REMOVAL FORCE TESTER---.

Col. 10, line 14; change "support units," to ---support unit,---.

Col. 11, line 10; change "said motor and" to ---said means and---.

Col. 11, line 13; change "and motor and" to ---and means and---.

Col. 12, line 15; change "cap being to" to ---cap to---.

Signed and Sealed this

Third Day of April, 1990

*Attest:*

HARRY F. MANBECK, JR.

*Attesting Officer*  *Commissioner of Patents and Trademarks*